Jan. 17, 1961 L. W. VAN DUSEN 2,968,460
VACUUM MOUNTING DEVICE
Filed May 18, 1959
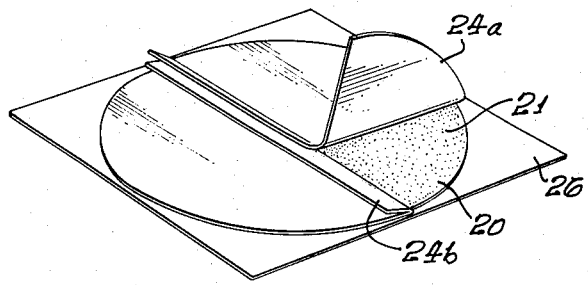
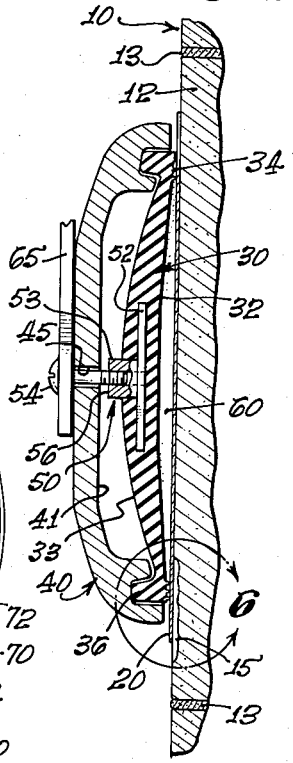
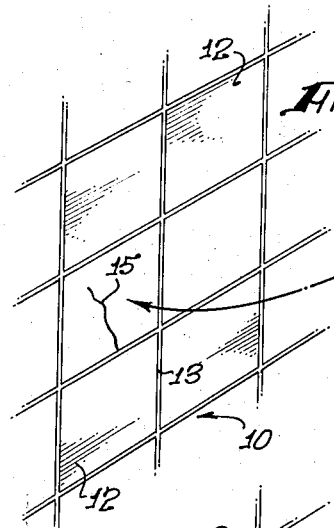
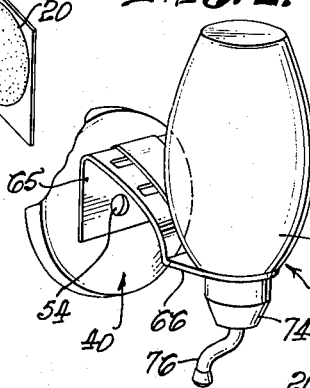
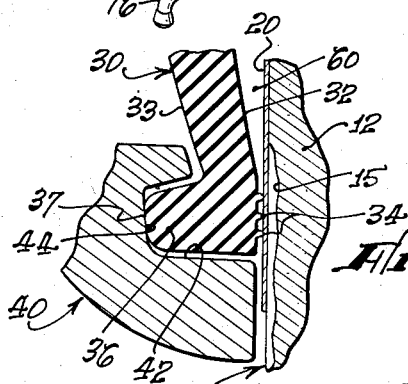
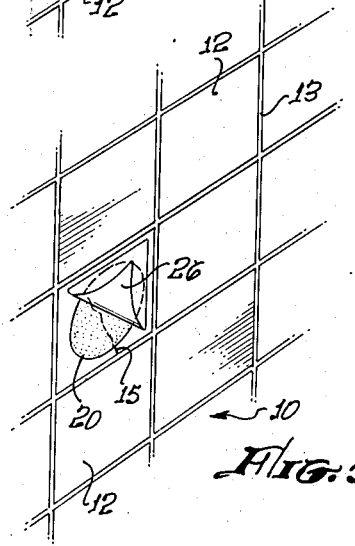
LAURENCE W. VAN DUSEN,
INVENTOR.
BY
Barbelew + Lewis United States Patent Office 2,968,460
Patented Jan. 17, 1961

2,968,460
VACUUM MOUNTING DEVICE
Laurence W. Van Dusen, P.O. Box 1067, Escondido, Calif.
Filed May 18, 1959, Ser. No. 813,924
5 Claims. (Cl. 248—206)

This invention relates generally to vacuum or suction cup devices such as are used to mount objects temporarily or permanently on a wall surface or the like.

Previously available vacuum cup devices are capable of providing convenient and reliable support when applied to a narrow range of surface types having suitable properties. The present invention is concerned particularly with improvements which permit vacuum cup devices to be mounted successfully on a far wider variety of surfaces having less favorable properties.

A more particular object of the invention is to provide a vacuum cup mounting device that can be used effectively on superficially smooth wall surfaces such as are ordinarily found in bathrooms and kitchens, for example, typically including ceramic tile, linoleum and many other prepared surfacing materials, which have surface defects or which are for any reason not always completely impervious to air. Although the diffusion of air through such surfaces is often extremely slow, it tends ultimately to destroy the vacuum between the cup-shaped fitting and the wall, thus releasing the support.

In accordance with one aspect of the present invention, I have discovered that vacuum fittings can conveniently be mounted on a wide variety of materials that are not completely impervious to air. That is accomplished by means of the combination of a pressure sensitive adhesive membrane which is applied to the wall surface in sealing relation and a vacuum cup device which is mounted on the outer face of the membrane.

I have further discovered that the efficacy and reliability of such a combination may be significantly improved by providing a layer of pressure sensitive adhesive on the outer face of the sealing membrane, as well as on its inner face. Such an outer layer of adhesive provides a stable and hermetically sealed bond between the membrane and the inner face of the vacuum cup. That bond can be further improved and stabilized, particularly during the process of installation, by providing on the contact face of the vacuum cup one or more narrow ridges having a sharp crest that is adapted to penetrate the outer layer of adhesive on the membrane.

A wide variety of detailed vacuum cup structures may be employed in the described combinations. It is preferred, however, to utilize an accentuated type of suction cup, in which the vacuum between the cup and the mounting surface is increased by mechanically drawing a central portion of the flexible cup structure away from the mounting surface after an initial peripheral bond has been established.

In accordance with a further aspect of the invention, the effectiveness of a vacuum mounting device of accentuated type is improved, particularly on mounting surfaces that are not perfectly plane, by providing a relatively thick sealing flange at the extreme periphery of the cup member. The accentuating mechanism then engages the top of that sealing flange.

A full understanding of the invention and of its further objects and advantages will be had from the following description of an illustrative manner of carrying it out. That description, of which the accompanying drawings form a part, is intended only as illustration, and its particulars may be varied in many ways without departing from the true scope of the invention.

In the drawings:

Fig. 1 is a vertical axial section representing an illustrative mounting assembly in accordance with the invention mounted on a wall surface;

Fig. 2 is a schematic perspective representing a soap dispenser supported on the mounting assembly of Fig. 1;

Fig. 3 is a perspective representing an illustrative sealing membrane;

Fig. 4 is a perspective representing an illustrative wall surface;

Fig. 5 is a perspective representing a sealing membrane in position on a wall surface; and Fig. 6 is an enlarged detail of an indicated portion of Fig. 1.

In the drawings a wall surface is indicated generally at 10, illustratively comprising ceramic tiles 12 assembled with cement 13. Such tiles are frequently found to have cracks in their surface glaze, as represented somewhat schematically at 15. Those cracks are illustrative of a wide variety of wall conditions which may permit air movement outwardly through the wall surface. In some instances, the air emerging from a wall surface has traveled through the body of the wall from behind. In other instances, illustrated by surface cracks in an otherwise air-impervious material, the emerging air may have traveled essentially parallel to the surface from one point to another.

In accordance with one aspect of the present invention, the vacuum mounting assembly includes a membrane 20 of air-impermeable, flexible sheet material. The membrane is typically circular, and is coated on at least one side, and preferably on both sides as illustratively shown, with a layer of pressure sensitive adhesive which may be of conventional type. Each adhesive layer is typically initially covered by a protective sheet of waxed paper or the like, which may be peeled off to expose the fresh pressure sensitive material. As illustrated in Fig. 3, the protective cover on the inner face of membrane 20 is preferably formed of two overlapping pieces 24a and 24b, facilitating their removal. The outer face of the membrane may be covered by square sheet 26.

After peeling off sheets 24a and 24b, as indicated in Fig. 3, the inner adhesive covered face 21 of membrane 20 is available, as shown in Fig. 4, for application to a tile surface. After such application, firm pressure is applied to the membrane via outer protective sheet 26, to insure an effective bond of the inner adhesive layer and the wall surface. The outer protective layer 26 may then be peeled off, as indicated in Fig. 5, leaving membrane 20 securely bonded to the wall. The mounted membrane acts as a hermetic seal for any pores or cracks that may exist in the wall surface, such as the illustrative surface crack 15. That sealing action is represented especially clearly in Figs. 1 and 6. Even if crack 15 extends beyond the periphery of membrane 20, atmospheric air entering exposed parts of the crack cannot escape outward through the wall surface where it is covered by the sealing membrane.

The present illustrative vacuum device comprises a circular, resilient, air impermeable suction member 30; a rigid cap member 40 adapted to overlie the suction member and engage its periphery; and tensioning means 50 for drawing the central portion of the suction member forcibly toward the cap member.

Suction member 30 is typically made of rubber, and has a circular inner face 32 that is normally almost flat, being preferably slightly concave. Adjacent the periphery of face 32 are preferably provided a plurality of spaced concentric circular beads or ridges 34 formed integrally with the suction member. Three such ridges are shown illustratively, their size being exaggerated for clarity of illustration. The ridges preferably extend only a few thousandths of an inch from face 32, and terminate, as seen in section, in a sharp acute angle. When suction member 30 is brought into peripheral contact with the mounted membrane 20, as shown in Figs. 1 and 2, such ridges 34 have the advantage of penetrating into the adhesive layer on the outer face of membrane 20 and anchoring the suction member firmly against movement parallel to the mounting face. They provide a tighter and more reliable seal, particularly when the suction member is first applied and during the process of stressing an accentuated type of suction device.

Cap member 40 is typically made of metal, and is so formed as to engage the periphery of suction member 30 and to be spaced outwardly from the central portion of the suction member when the latter is not tensioned. After assembly of the described parts, tensioning means 50 is operated manually to distort the central portion of the suction member axially outwardly toward the inner face 41 of the cap member and away from membrane 20. As shown, tensioning means 50 comprises a circular plate 52 substantially embedded in the central portion of the suction member with an axial threaded boss 53 protruding outwardly; and a screw 54 extending coaxially inwardly through a central bore 45 in the cap member and threadedly engaging boss 53. Suitable rotation of screw 54 produces the described tensioning movement of suction member 30. That movement increases the volume of the sealed chamber 60 between face 32 of the suction member and membrane 20, which is anchored to the fixed face of wall tile 12. A partial vacuum is thereby produced in chamber 60, anchoring the entire mounting assembly to the wall.

The position of the parts shown illustratively in Fig. 1 corresponds typically to partial completion of the described tensioning operation. When that operation has been completed, outer annular face 56 of boss 53 typically engages inner face 41 of the cap member, providing a positive stop for the tensioning operation, and leaving screw 54 tight and effectively rigid. Hence screw 54 may be employed, if desired, to mount a support bracket 65 of any desired type on the mounting assembly. Alternatively, bracket 65 may be mounted on cap member 40 by fastening means of any desired type, which may be entirely independent of tensioning mechanism 50. As represented in Fig. 2, bracket 65 is provided with an outwardly extending arm 66 of suitable form for mounting a dispensing device 70. Device 70 comprises a container 72 for holding a supply of powered soap or the like, a valve mechanism 74 actuable to release a metered quantity of the soap, and a valve actuating handle 76 extending downwardly from the valve mechanism.

Sealing membrane 20 may comprise a sheet of any suitable flexible air-impermeable material, such, for example, as a kraft paper pressure impregnated with a sheet of polyvinyl chloride resin, or paper impregnated with such resin. The pressure sensitive adhesive typically comprises a urea-formaldeyde resin prepared and applied in known manner. Some adhesive materials of known type are themselves air-impervious, and may be employed to impregnate the membrane sheet, or may itself constitute the entire membrane assembly. The degree of softness of the pressure sensitive adhesive is so controlled or selected as to adhere promptly and effectively to surfaces having the physical nature of linoleum, tile and the like, while providing a hard enough bonding action to resist being drawn away from the wall by the vacuum in chamber 60. A particularly illustrative pressure adhesive membrane which is satisfactory for the present purpose is the pressure sensitive transfer film manufactured by Angier Adhesives, Division of Interchemical Corporation, under the identifying number PT–5502.

In accordance with a further aspect of the present invention, the peripheral contacting portions of cap member 40 and suction member 30 are formed in a novel manner so that the rigid cap member does not interfere with effective flexibility of the suction member. By preserving flexibility of the suction member in a direction transverse of the wall face, effective sealing contact is obtainable even with wall surfaces that are not accurately plane.

That is accomplished by integrally forming a thick and relatively narrow flange at the extreme periphery of the suction member. That flange extends axially outwardly from the outer face 32 of the suction member, and terminates in a substantially flat annular face 37. The inner face of cap member 40 is provided with a circular channel 42 which is generally complementary in form to flange 36. In particular, channel 42 has a substantially flat annular bottom face 44 which is adapted to engage face 37. However, the radial width of channel 42 preferably exceeds that of flange 36, so that the opposing side walls of the groove and channel are radially spaced from each other, as clearly illustrated in Fig. 6.

With that preferred and novel structure, operation of tensioning means 50 causes the soft rubber comprising flange 36 to be compressed between face 44 and the outer face of sealing membrane 20. Effective pressure is thereby exerted on the sealing member substantially independently of slight departures of the wall face from perfect flatness. Such compression of the flange causes it to flatten slightly, substantially filling channel 42, so that, after tensioning, the side walls of the channel effectively support the flange and prevent it from folding or buckling. Provision of groove 42 thus permits flange 36 to be higher and narrower than would otherwise be feasible, providing greater resilience of sealing action and more effective concentration of the resulting sealing pressure at the desired narrow zone of membrane 20.

I claim:

1. A vacuum actuated mounting assembly capable of being mounted substantially permanently on an air-permeable mounting surface, said assembly comprising the combination of a circular resilient suction member having an air-impermeable working face, an air-impermeable membrane, a layer of pressure sensitive adhesive material for adhering one face of the membrane to the mounting surface, the other face of the membrane being adapted to receive the working face of the suction member and form therewith a peripheral seal.

2. A mounting assembly as defined in claim 1, and including also a second layer of pressure sensitive adhesive carried by said other face of the membrane, the peripheral portion of said second layer forming an air-impermeable seal with the working face of the suction member.

3. A vacuum actuated mounting assembly adapted for mounting on a mounting surface and comprising the combination of a circular resilient suction member having a working face and an outer face, an air-impermeable membrane, the inner face of the membrane carrying a layer of pressure sensitive adhesive material for adhering the membrane to the mounting surface, the other face of the membrane being adapted to receive the suction member and form therewith a peripheral seal, rigid cap means having a concave inner face adapted to peripherally engage the outer face of the suction member, and means manually actuable to move the central portion of the suction member forcibly toward the inner face of the cap means to produce a vacuum between the suction member and the membrane.

4. A vacuum actuated mounting assembly capable of being mounted substantially permanently on an air-permeable mounting surface, said assembly comprising the combination of a circular resilient suction member having an air-impermeable working face and an outer face, a rigid tensioning member substantially embedded in the suction member and accessible through the outer face thereof, an air-impermeable membrane, a layer of pressure sensitive adhesive material for adhering one face of the membrane to the mounting surface, the other face of the membrane being adapted to receive the working face of the suction member and form therewith a peripheral seal, rigid cap means having a concave inner face adapted to peripherally engage the outer face of the suction member, the opposing central portions of those faces being spaced, and tensioning means actuable to move the tensioning member forcibly toward the cap means to produce a vacuum between the suction member and the membrane, said vacuum being independent of the permeability of the mounting surface.

5. A mounting assembly as defined in claim 2, and wherein the working face of the suction member carries at least one circular bead which penetrates said second layer of adhesive, forms a more effective initial seal and prevents lateral movement of the suction member relative to the membrane.

References Cited in the file of this patent

UNITED STATES PATENTS 2,730,325     Van Dusen _____ Jan. 10, 1956

FOREIGN PATENTS 465,314     Great Britain _____ May 5, 1937